(No Model.) 2 Sheets—Sheet 1.

N. SWAGER.
SULKY OR RIDING PLOW.

No. 466,284. Patented Dec. 29, 1891.

Witnesses:
H. B. Kingsbery
C. L. Northup

Inventor:
Nelson Swager,
by Wm. E. Poulter
attorney (No Model.)  2 Sheets—Sheet 2.

N. SWAGER.
SULKY OR RIDING PLOW.

No. 466,284. Patented Dec. 29, 1891.

Witnesses:
H. B. Kingsbery
C. G. Northrup

Inventor:
Nelson Swager,
by Wm E. Poulter,
attorney

United States Patent Office.

NELSON SWAGER, OF DUBUQUE, IOWA, ASSIGNOR TO THE NORWEGIAN PLOW COMPANY, OF SAME PLACE.

SULKY OR RIDING PLOW.

SPECIFICATION forming part of Letters Patent No. 466,284, dated December 29, 1891.

Application filed September 12, 1891. Serial No. 405,458. (No model.)

*To all whom it may concern:*

Be it known that I, NELSON SWAGER, a citizen of the United States, residing at Dubuque, in the county of Dubuque and State of Iowa, have invented certain new and useful Improvements in Sulky or Riding Plows; and I do hereby declare the following to be a full, clear, and exact description of the invention, such as will enable others skilled in the art to which it appertains to make and use the same.

My invention has relation to sulky or riding plows, and more particularly to the devices whereby the plow may be lowered into and raised out of the ground when desired, to the devices for clutching the colter, and to the devices for raising or lowering the rear portion of the plow-frame with respect to the rear caster-wheel; and among the objects sought to be attained are to provide simple and easily-operated devices, whereby either the toe or the heel of the plow, or both, may be lowered into and raised from the ground when desired, to provide a simple device for securing detachably the colter in position, and to provide a device whereby the heel of the plow and rear portion of the plow-frame may be raised or lowered with respect to the rear caster-wheel when the plow is turning a corner to insure the point of said plow being held firmly in the ground.

With the above and other objects in view the invention consists in the construction, arrangement, and combination of parts, as hereinafter fully described, illustrated in the accompanying drawings, and pointed out in the appended clauses of claim.

Figure 1:
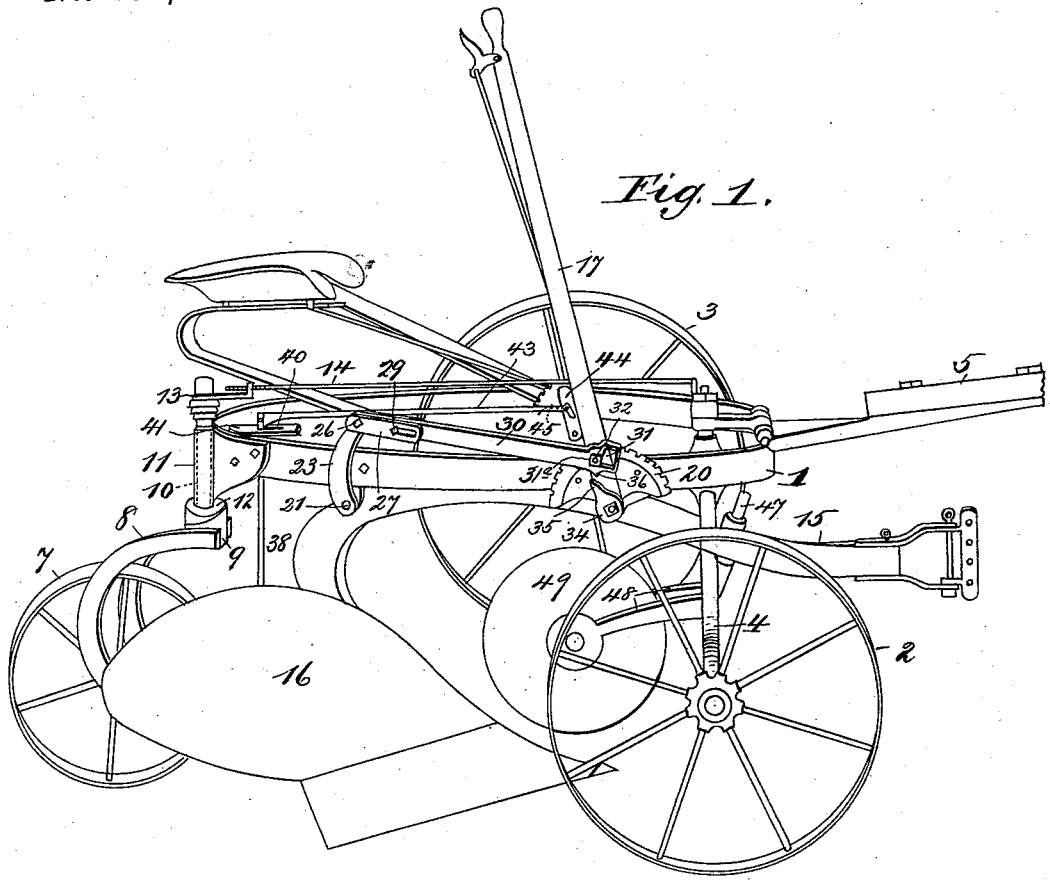
Figures 3, 8:
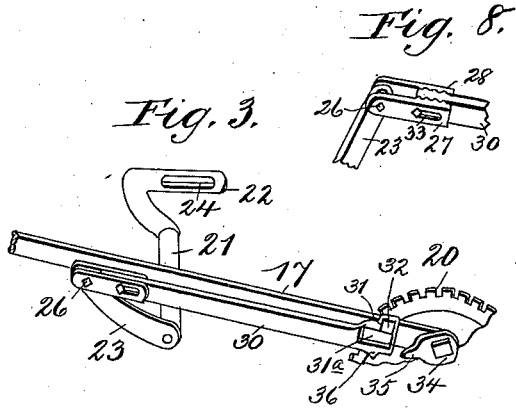
Figure 4:
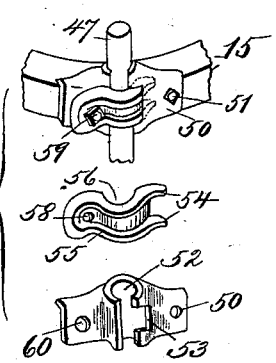
Figure 2:
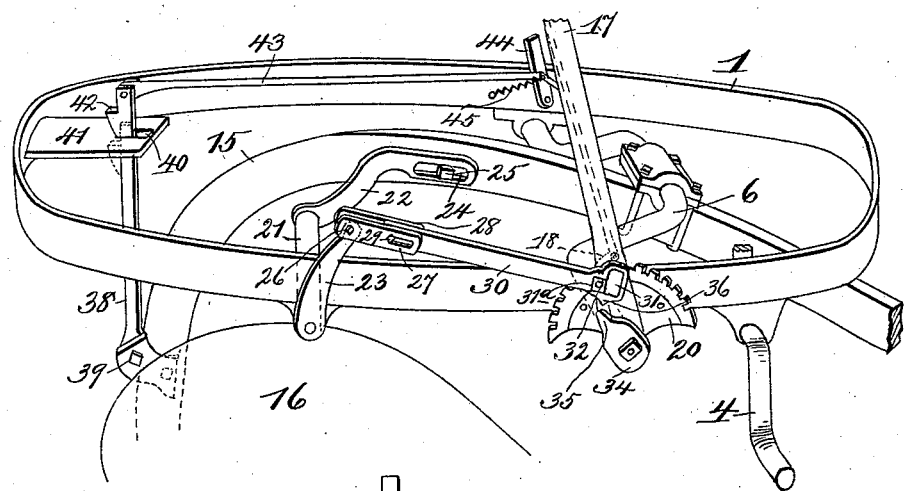
Figure 7:
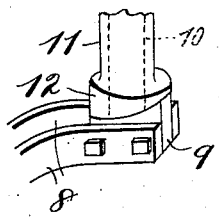
Figure 5:
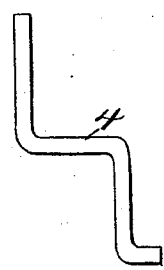
Figure 6:
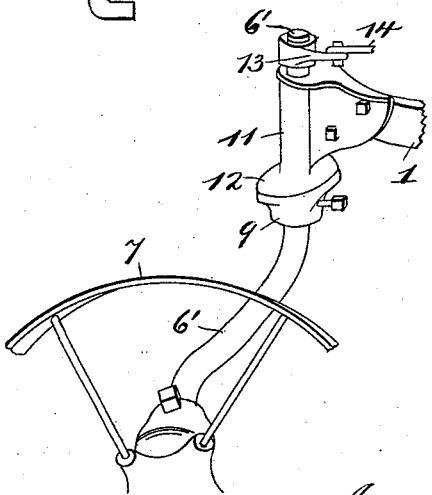

In the drawings, Figure 1 is a perspective view of a sulky or riding plow embodying my improvements. Fig. 2 is a like view of Fig. 1, on a slightly enlarged scale, with parts removed for the sake of clearness. Fig. 3 is a detail perspective view of a portion of the raising and lowering devices. Fig. 4 is a detail perspective view of the means for securing the colter in position. Fig. 5 is a like view of the means for raising the heel of the plow and rear end of the plow-frame with respect to the rear caster-wheel. Fig. 6 is a detail perspective view illustrating a modification in the means for raising the heel of the plow and rear end of the plow-frame with respect to the rear caster-wheel. Fig. 7 is a detail view of the axle upon which one of the forward wheels is mounted. Fig. 8 is a like view hereinafter referred to.

1 indicates the plow-frame, which may be of any suitable construction, that shown having substantially a rectangular shape and supported at its forward end by the wheels 2 3. The former is mounted upon an axle 4, having substantially the shape shown in Fig. 7, said axle passing through a bearing on the frame and upwardly and having secured thereto one end of the tongue 5. The wheel 3 is mounted upon one end of a crank shaft or axle 6, having bearings in the plow-frame.

As shown in Fig. 1, the rear end of the plow-frame is supported by means of a caster-wheel 7, mounted between the arms 8, which latter are provided intermediate their upper ends with a bearing-block 9, having an upper curved or segmental bearing-surface. The block 9 is provided with an upwardly-extending spindle 10, which passes through a sleeve 11, secured to the plow-frame, said sleeve having an enlargement 12, whose under surface is curved and bears upon the curved surface of the block 9. The upper end of the spindle 10 is adapted to be turned by means of the crank-arm 13 and rod 14 in the usual manner. Thus a cam device is formed by means of the block 9 and enlargement 12, so that when the spindle is turned the plow-frame will be raised with respect to the caster-wheel, as will also the heel of the plow a trifle, as will be presently seen, thus causing the point of the plow to be held more firmly in the ground, which is desirable when turning corners.

In Fig. 6 I have shown a slightly different mode of connecting the caster-wheel with the plow-frame. In said figure the caster-wheel is mounted on one end of a curved axle 6', which carries near its upper end the cam-block 9, against whose upper cam-face bears the enlargement 12, whose lower surface is curved, as before described. The axle passes upwardly through the sleeve 11, (similarly to the spindle 10,) and to the upper end of the axle is connected one end of the rod 14. Thus by turning the axle 6' I obtain a result similar to that obtained by the arrangement shown in Fig. 1.

15 indicates the plow-beam, to which is secured the plow 16. The forward portion of the beam is supported by the crank-axle 6, to which it is clamped by any suitable means, as shown. One end of said axle passes through the plow-frame and has secured to its projecting end an operating-lever 17, provided with the usual spring-actuated dog 18, said dog engaging the teeth of a sector-shaped plate 20, secured to the side of the plow-frame. By moving the lever backwardly or forwardly it will be seen that the forward portion of the plow-beam will be caused to be raised or lowered with respect to said plow-frame, and thus raise or lower the point of the plow 16 out of or into the ground.

21 indicates a shaft having a bearing in the plow-frame in rear of the shaft 6, said shaft 21 being provided with crank-arms 22 23, the former of which is provided with a slot 24 to receive a stud 25, projecting from the plow-beam. The upper end of arm 23 is pivotally mounted upon a bolt 26, connecting plates 27 28, which are secured by means of bolt 29 to one end of a rod 30, whose other end is provided with an angular slot 31 31ª, as shown. Through said slot projects a bolt or stud 32, carried by the lever 17, said bolt, when the parts are in the position represented in Fig. 1, with the plow lowered into the ground, occupying the position in the slot shown in said Fig. 1. When the lever is thrown backwardly, the rod 30 will be pushed rearwardly, causing the shaft 21 to partially turn and thus cause the elevation of the crank-arm 22. Thus said arm will simultaneously and in conjunction with the crank-shaft 6 when the latter is operated by the lever, as before set forth, effect the raising of the plow-beam. When the lever is being pushed rearwardly, so as to occupy the position shown in Fig. 3, (in which position the plow-beam will be at its highest position, with the point of the plow out of the ground,) the bolt 32 will gradually move out of the portion 31 of the slot and into the portion 31ª of the latter, as shown in Fig. 3. The plates 27 28 are toothed or serrated on their opposing inner faces, and the end of the rod 30 is likewise toothed or serrated, so that when the bolt 29 is tightened the rod will be firmly secured or held between the plates with no liability of becoming loosened. The plates and the end of the rod 30 may be slotted, as shown at 33, to permit of the adjustment of the parts.

Rigidly secured to the shaft 6, adjacent to the lever 17, is a trip 34, having a nose 35, said trip occupying a position on the shaft at a slight angle to the lever 17, as shown. The rod 30 at the end adjacent to lever 17 is provided with a nose or projection 36, which when the parts are in the position represented in Figs. 1, 2, and 3 is disengaged from the nose 35.

The means for locking or maintaining the heel of the plow in its lowered position consist of a vertical rod 38, pivotally secured at its lower end to the plow-beam, as at 39, and extending upwardly through a slot 40 in a plate 41, secured to the plow-frame. The rod is provided near its upper end with a shoulder 42, which when the heel of the plow is on the ground engages the edge of the slot on the under side of the plate. To the upper end of the rod is connected one end of a horizontal rod 43, which extends forwardly and is secured to a rod or lever 44, pivoted to the frame and adapted to be operated by the foot of the driver. A spring 45, secured at one end to the plow-frame and at the other to the rod 43, serves to automatically retract the latter when the same is pushed forwardly by the foot pressing against the lever 44. It will thus be seen that when it is desired to disengage the shoulder of rod 38 from plate 41 to permit of the heel of the plow being raised simultaneously with the raising of the point of the plow through the medium of the devices hereinbefore described the driver presses forwardly upon lever 43, thus drawing forward the rod 44 and freeing the shoulder 42. Assuming the lever 17 to have been pushed rearwardly into the position shown in Fig. 3, with the point of the plow above the ground, if it now be desired to lower the plow-point the lever 17 is pushed forwardly, (the crank-arms 27 28 meanwhile holding the heel of the plow up,) and as the point is being lowered the nose 35 will have reached a position in rear of the nose 36, engaged the same, and, actuated thereby, will push forwardly the lever 30, causing the bolt 32 to enter the portion 31 of the slot, and upon the continued forward movement of the lever the nose 35 will by still engaging nose 36 cause the continued forward movement of rod 30, and thus effect the lowering of the heel of the plow by the time the point of the plow reaches the ground. The rod 38 will be simultaneously lowered until shoulder 42 is forced into engagement with the edge of slot 40 on under side of plate 41 by spring 45, thus locking the plow in position with its heel lowered.

For the purpose of readily securing the colter 49 to and disconnecting the same from the plow-beam, I employ the following means: 47 indicates the stem or rod, which at its lower end is secured to the arms 48, carrying the colter 49. 50 indicates a plate secured to one edge of the plow-beam by means of bolt 51. This plate is provided with a semi or nearly cylindrical socket 52 to receive the stem 47, and is cut away, as at 53, to permit the ears or tongues 54, formed on a second plate 55, to be passed through said cut-away portion and engage behind the plate 50, as seen in dotted lines in Fig. 4. The plate 55 is also provided with a semi-cylindrical socket 56, which, in conjunction with the socket 52, forms a cylindrical bearing for the stem 47. The plate 55 has a perforation 58 to permit of a bolt 59 being passed therethrough and through a perforation 60 in plate 50 and into the plow-beam, thus firmly securing the plate 55 in position, and at the same time adapted to permit said plate being readily loosened or disconnected to allow the stem 47 to be withdrawn or adjusted.

The advantages derived from my various improvements will be apparent from the foregoing description, taken in connection with the accompanying drawings, and although I have herein described and illustrated the preferred form and construction of my invention it will be understood that various changes or modifications might be made in the same without departing from the spirit thereof.

What I claim as new, and desire to secure by Letters Patent, is—

1. The combination, with the plow-frame and the supporting-wheels therefor, of a crank-shaft supported by said frame, an operating-lever mounted upon one end of said crank-shaft, a plow-beam secured to the crank-shaft, a second crank-shaft supported by the plow-frame and having crank-arms, one of which is secured to the plow-beam, and a connecting-rod secured at one end to the other crank-arm and its other end to the operating-lever, all arranged for co-operation, substantially as described.

2. The combination, with the plow-frame and the supporting-wheels thereof, of a crank-shaft supported by said frame, an operating-lever upon one end of said shaft, a plow-beam secured to the crank-shaft, a second crank-shaft supported by the plow-frame and having crank-arms, one of which is secured to the plow-beam, a rod connected at one end to the other crank-arm and at its other end to the operating-lever, and a tripping device carried by the first-mentioned crank-shaft and adapted to operate the said rod when the operating-lever is pushed forwardly to cause the second crank-shaft to lower the rear portion of the plow-beam, all arranged for co-operation, substantially as described.

3. The combination, with the plow-beam and the supporting-wheels therefor, of a crank-shaft supported by the plow-frame, an operating-lever mounted upon one end of said crank-shaft, a plow-beam secured to the crank-shaft, a second crank-shaft supported by the plow-frame and having crank-arms, one of which is secured to the plow-beam, a rod secured at one end to the other crank-arm and at its opposite end to the operating-lever, a locking device carried by the said beam and adapted to lock the latter when the rear portion thereof is in its lowered position, and means for disengaging the locking device to permit of the rear portion of the beam being raised, substantially as described.

4. The combination, with the plow-frame and the supporting-wheels therefor, of a crank-shaft supported by said frame, an operating-lever upon one end of said shaft, a plow-beam secured to the crank-shaft, a second crank-shaft supported by the plow-frame and having crank-arms, one of which is secured to the plow-beam, a rod secured at one end to the other crank-arm and at the opposite end to the operating-lever, a vertical rod secured to the rear portion of the plow-beam and having a shoulder, a slotted plate carried by the plow-frame and through which extends the said rod, a horizontal rod secured at one end to the vertical rod and at its other end to the foot-lever pivoted to the plow-frame, and a spring for retracting the horizontal rod when the same has been pushed forwardly by the foot-lever, all arranged for co-operation, substantially as described.

5. The herein-described clutch, comprising the plate 50, having a socket 52, a perforation 60, and the cut-away portion 53, and the plate 55, having tongues 54 adapted to enter the cut-away portion 53, a socket 56 and a perforation 58, said socket and perforation being adapted to coincide with the socket and perforation of plate 50.

6. The combination, with the plow-frame, of a caster-wheel mounted between supporting-arms, a spindle pivotally connected to the plow-frame, a sleeve surrounding said spindle, and a cam device carried by the supporting-arms and the sleeve and adapted to raise and lower the plow-frame with respect to the caster-wheel when said spindle is turned, as described.

7. The combination, with the plow-frame, of a caster-wheel mounted between supporting-arms 8, the bearing-block 9, having a curved upper surface, the spindle 10, rising from said block, and the sleeve 11, secured to the plow-frame and provided with an enlargement 12, having its under surface curved and bearing upon the block 9, as and for the purpose specified.

In testimony whereof I affix my signature in presence of two witnesses.

NELSON SWAGER.

Witnesses:
JOS. MARKWARD,
ALEX. SIMPLOT.